3,267,117
NOVEL SUBSTITUTED INDOL-5-OLS
George Rodger Allen, Jr., Old Tappan, N.J., and John Frank Poletto, Nanuet, N.Y., assignors to American Cyanamid Company, Stamford, Conn., a corporation of Maine
No Drawing. Filed July 30, 1965, Ser. No. 476,184
2 Claims. (Cl. 260—326.16)

This application is a continuation-in-part of our copending application Serial No. 388,312, filed August 7, 1964; which in turn is a continuation-in-part of our application Serial No. 315,710, filed October 11, 1963, now abandoned.

This invention relates to new organic compounds and, more particularly, is concerned with novel indol-5-ols which may be represented by the following general formula:

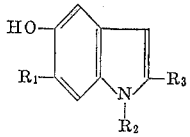

wherein $R_1$ is lower alkyl, $R_2$ is lower alkyl or β-hydroxy lower alkyl, and $R_3$ is lower alkyl. Suitable lower alkyl groups are those having up to about 6 carbon atoms. Suitable β-hydroxy lower alkyl groups contemplated by the present invention are those having up to about 6 carbon atoms such as, for example, β-hydroxyethyl, β-hydroxy-n-propyl, β-hydroxy-iso-propyl, β-hydroxy-n-butyl, etc.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water.

The novel indol-5-ols of the present invention are non-lethal psychoactive depressants and as such are useful in the treatment of certain mental disorders. They may be administered either orally or parenterally and when so administered they have been found to exhibit central nervous system depressant action in amounts ranging from about 1.0 to about 50.0 milligrams per kilogram of body weight. It is indeed surprising that the known 2,6-dimethylindol-5-ol exhibits no central nervous system depressant action, but rather is a central nervous system excitant.

A preferred dosage unit form is a tablet containing the novel indol-5-ol as the therapeutically active ingredient. For adults, such tablets should contain from 0.1 to 3.0 grams of the indol-5-ol. Of course, a tablet scored to be broken into dosage units or a number of tablets to be taken one at a time to constitute a dosage unit may also be employed. A second preferred dosage unit form is a capsule containing as the therapeutically active ingredient from 0.1 to 3.0 grams of the novel indol-5-ol. The capsule may be in either the hard or soft variety and may be made of any suitable capsule material which will disintegrate in the digestive tract. Examples of such encapsulating materials are gelatin and methyl cellulose.

Of course, the dosage unit form of the novel indol-5-ol of the present invention may also contain either inert or medically active material. For instance, when the dosage unit form is a tablet or granules there may also be present various binders, fillers, or solid diluents. There may also be present various medically active materials such as, for instance, aspirin, etc. When the dosage unit form is a capsule it may contain, in addition to materials of the above type, a liquid carrier such as a fatty oil; and regardless of the dosage unit form, there may be present various flavors and excipients. Of course, any materials used in preparing the dosage unit forms must be pharmaceutically pure and substantially non-toxic in the amount employed.

The novel indol-5-ols of the present invention are also useful as intermediates in the preparation of the biologically active 3-(α-carbamoyloxy-lower alkyl)-4,7-indoloquinones as is set forth in greater detail in our copending application Serial No. 388,312, filed August 7, 1964.

The novel indol-5-ols of the present invention may be readily prepared as set forth in the following reaction scheme:

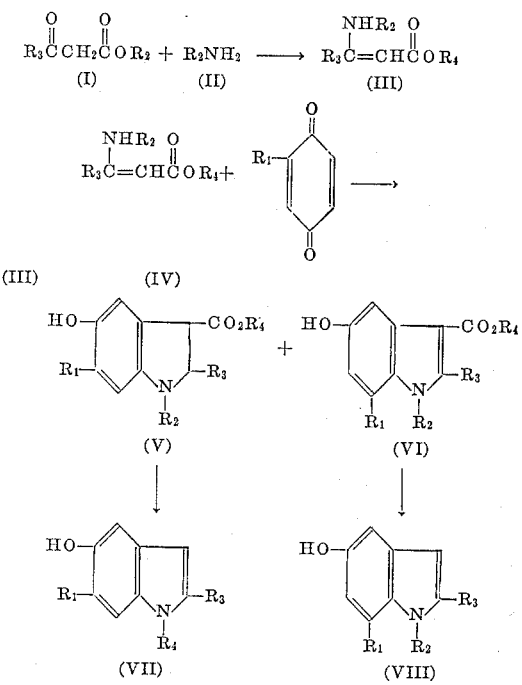

Thus, the indole system is generated by condensation of an alkyl-1,4-benzoquinone (IV) with an alkyl 3-alkylaminocrotonate (III). This latter substance is available from the reaction of an alkylamine (II) with a β-ketoester (I). The condensation of the benzoquinone (IV) and the aminocrotonate (III) usually gives a mixture of isomeric 5-hydroxyindole-3-carboxylic esters, e.g. (V) and (VI). These isomers may be separated by liquid-liquid partition chromatography on a neutral support, e.g. diatomaceous silica. The alkyl 5-hydroxy-1,2,6-trialkylindole-3-carboxylate (V) thus obtained may be decarbalkoxylated by any of several methods known to the art. The use of constant boiling hydrochloric acid is particularly advantageous for this transformation, inasmuch as this procedure converts the indole-3-carboxylic ester (V) into the novel 1,2,6-trialkylindole-5-ols (VII) of this invention in one step.

Alternatively, the mixture of indole esters (V) and (VI) may be decarbalkoxylated with constant boiling hydrochloric acid, and the resulting mixture of 1,2,6-trialkylindol-5-ol (VII) and 1,2,7-trialkylindol-5-ol (VIII) may be separated by liquid-liquid partition chromatography on diatomaceous silica.

In the instances wherein $R_2$ is β-hydroxy lower alkyl the preparation of the indol-5-ol is achieved by conversion of the indolecarboxylic ester (V) into the corresponding acid (V, $R_4$=H) by saponification and treatment of this latter material with a catalytic amount of mineral acid in a boiling lower alkanol.

The invention will be described in greater detail in conjunction with the following specific examples.

Example 1.—Ethyl β-ethylaminocrotonate

With mechanical stirring a stream of ethylamine is introduced into 98.5 g. (100 ml.) of ethyl acetoacetate for 3 hours. During the first hour cooling is required to hold the temperature at 35–40° C. where it is maintained throughout the reaction. Ether (200 ml.) is added, and the water is separated. The ether is removed from the organic phase and the residue is distilled under reduced pressure to give a water white liquid, B.P. 20 mm. 116–118° C., $n_D^{25}$ 1.4941, 104 g.

combined filtrate and washings are concentrated to about 50 ml. volume and placed in the refrigerator for 16 hours. The solid is collected by filtration and washed with boiling light petroleum ether to give an additional 3.90 g. of crystals. A sample is recrystallized from dilute ethanol containing a trace of sodium hydrosulfite to give off-white crystals, M.P. 196–198° C.

Examples 8–15

In the manner described in Example 7, the products of Table II are obtained.

TABLE II

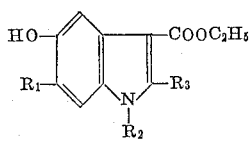

| Ex. No. | Starting Materials | | Product | $R_1$ | $R_2$ | $R_3$ | Chromatography | | | M.P., °C.[b] |
|---|---|---|---|---|---|---|---|---|---|---|
| | | | | | | | Solvent System[a] | H.B.V. | Vm/Vs | |
| 8 | Ethyl-3-methyl-aminocrotonate. | Toluquinone | Ethyl 5-hydroxy-1,2,6-trimethylindole-3-carboxylate. | $CH_3$ | $CH_3$ | $CH_3$ | | | | 222–225 |
| 9 | Product of Example 2. | ---do--- | Ethyl 5-hydroxy-2,6-dimethyl-1-propylindole-3-carboxylate. | $CH_3$ | $C_3H_7$ | $CH_3$ | HEDW (140:60:40:5) | 2.5 | 3.07 | 193.5–195.0 |
| 10 | Product of Example 4. | ---do--- | Ethyl 1-butyl-5-hydroxy-2,6-dimethylindole-3-carboxylate. | $CH_3$ | $C_4H_9$ | $CH_3$ | HEM₁W (85:15:17:4) | 2.5 | 2.71 | 174.0–176.5 |
| 11 | Product of Example 3. | ---do--- | Ethyl 1-isopropyl-5-hydroxy-2,6-dimethylindole-3-carboxylate. | $CH_3$ | $i$-$C_3H_7$ | $CH_3$ | HEM₁W (80:20:17:4) | 1.4 | 3.08 | 201.5–203.0 |
| 12 | Ethyl-3-aminocrotonate. | Ethyl-1,4-benzoquinone.[c] | Ethyl 6-ethyl-5-hydroxy-2-methylindole-3-carboxylate. | $C_2H_5$ | H | $CH_3$ | HEMW (70:30:17:4) | 3.2 | 2.68 | 200–202 |
| 13 | Product of Example 1. | ---do--- | Ethyl 1,6-diethyl-5-hydroxy-2-methylindole-3-carboxylate. | $C_2H_5$ | $C_2H_5$ | $CH_3$ | HM (1:1) | 4.5 | 2.80 | 207–208 |
| 14 | Product of Example 6. | Toluquinone | Ethyl 1,2-diethyl-5-hydroxy-6-methylindole-3-carboxylate. | $CH_3$ | $C_2H_5$ | $C_2H_5$ | HEM₁W (80:20:17:4) | 1.3 | 3.06 | 169.0–170.5 |
| 15 | Product of Example 5. | ---do--- | Ethyl 5-hydroxy-1-(β-hydroxy-ethyl)-2,6-dimethylindole-3-carboxylate. | $CH_3$ | $C_2H_4OH$ | $CH_3$ | HEMW (60:40:15:6) | 2.4 | 3.00 | 195–196 |

[a] Solvents: H=heptane, E=ethyl acetate, M=methanol, W=water, M₁=2-methoxyethanol, D=dimethylformamide; neutral support:diatomaceous silica.
[b] Except where noted otherwise, all compounds were recrystallized from acetone-hexane.
[c] E. Clemmensen, Ber., 47, 56 (1914).

Examples 2–6

By the procedure described in Example 1 the compounds of Table I are obtained.

TABLE I

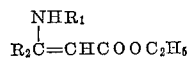

| Example No. | Starting Materials | | Product | | B.P., °C. (pressure) |
|---|---|---|---|---|---|
| | Ester | Amine | $R_1$ | $R_2$ | |
| 2 | Ethyl Acetoacetate | Propyl amine | $C_3H_7$ | $CH_3$ | 119–119.5° (14 mm.). |
| 3 | ---do--- | i-Propyl amine | $(CH_3)_2CH$ | $CH_3$ | 106–106.5° (11 mm.). |
| 4 | ---do--- | Butyl amine | $C_4H_9$ | $CH_3$ | 129.5–131.0° (14 mm.) |
| 5 | ---do--- | Ethanolamine | $CH_2CH_2OH$ | $CH_3$ | Decomposes. |
| 6 | Ethyl Propionylacetate | Ethyl amine | $C_2H_5$ | $C_2H_5$ | 118–121° (14 mm.). |

Example 7.—Ethyl 1-ethyl-5-hydroxy-2,6-dimethyl-3-indole-carboxylate

A solution of 12.2 g. of (0.0855 mole) of ethyl-β-ethyl-aminocrotonate in 60 ml. of acetone is thoroughly swept with nitrogen and treated with 10.9 g. (0.085 mole) of toluquinone. The deep red solution is heated on the steam-bath for 2 hours, cooled in an ice-bath and filtered to give a dark solid. This material is washed with cold acetone and dried to give 4.45 g. of gray crystals. The

Example 16.—1,2,6-trimethylindol-5-ol

A mixture of 13.9 g. of ethyl 5-hydroxy-1,2,6-trimethylindole-3-carboxylate and ethyl 5-hydroxy-1,2,7-trimethylindole-3-carboxylate is suspended in one liter of 20% hydrochloric acid solution. This suspension is heated at reflux temperature under nitrogen and with mechanical stirring for 2.5 hours; all solid dissolves. The pH of the solution is adjusted to 5.5–6.5 by addition of a concentrated sodium hydroxide solution. The cooled mixture is extracted with methylene chloride, and the dried (magnesium sulfate) extracts are evaporated to give a residue that crystallizes from methylene chloride-petroleum ether to furnish 9.8 g. (100%) of crystals. A 5.00 g.-sample of this material is subjected to partition chromatography on diatomaceous silica using a heptane:ethyl acetate:methanol:water (80:20:17:4) system. The fraction with peak hold-back volume 2.4 (Vm/Vs 3.12) is recrystallized from methylene chloride-petroleum ether to give in two crops 3.233 g. (65%) of white crystals, M.P. 130.0°–131.5° C.

*Examples 17–22*

In the manner described in Example 16 the compounds of Table III are obtained.

TABLE III

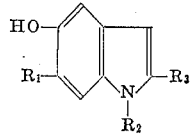

| Example Number | Starting Material | Product | $R_1$ | $R_2$ | $R_3$ | M.P., °C.ᵃ |
|---|---|---|---|---|---|---|
| 17 | Product of Example 7 | 1-ethyl-2,6-dimethylindol-5-ol | $CH_3$ | $C_2H_5$ | $CH_3$ | 90–92, 120–122 |
| 18 | Product of Example 9 | 2,6-dimethyl-1-propylindol-5-ol | $CH_3$ | $C_3H_7$ | $CH_3$ | 127–128 |
| 19 | Product of Example 11 | 1-isopropyl-2,6-dimethylindol-5-ol | $CH_3$ | i-$C_3H_7$ | $CH_3$ | 94–95 |
| 20 | Product of Example 10 | 1-butyl-2,6-dimethylindol-5-ol | $CH_3$ | $C_4H_9$ | $CH_3$ | 74–75 |
| 21 | Product of Example 13 | 1,6-diethyl-2-methylindol-5-ol | $C_2H_5$ | $C_2H_5$ | $CH_3$ | 81–82 |
| 22 | Product of Example 14 | 1,2-diethyl-6-methylindol-5-ol | $CH_3$ | $C_2H_5$ | $C_2H_5$ | 88–90 |

ᵃ All compounds are recrystallized from methylene chloride-petroleum ether; they have λmax 3.00–3.15μ and no significant absorption in the carbonyl region; λmax 209–210 (ε26,800–29,400), 278–280 (ε8460–9350), 295–298 (ε6910–7520), 308–310 mμ (ε4470–5490).

*Example 23.—1-(hydroxyethyl)-2,6-dimethylindol-5-ol*

A solution of 183.1 g. (0.66 mole) of ethyl 5-hydroxy-1-hydroxyethyl-2,6-dimethyl-3-indolecarboxylate in 2000 ml. of 2 N sodium hydroxide solution is heated at reflux temperature under nitrogen with mechanical stirring for 2 hours. The cooled solution is made acid to litmus paper with hydrochloric acid solution. The moist precipitated solid, which has M.P. 155–159° C. (gas) and λmax 3.00, 3.80, 4.20, 6.08μ, is suspended in 1500 ml. of methanol. This solution is warmed of the steam bath. Before the solution reaches boiling, copious evolution of gas bubbles is noted. Once boiling temperature is attained all solid has dissolved; this solution is heated at its boiling point for 1 hour and then concentrated to 700 ml. Water (1300 ml.) is added, and the solution is chilled overnight. Filtration gives 108.7 g. of product as crystals, M.P. 118–120° C. A sample is obtained from acetone-hexane as white needles, M.P. 121–123° C.; λmax 208, 278, 294, 308 mμ (ε 26,300; 8840; 6980; 4930); 2.98μ.

What is claimed is:
1. A compound of the formula:

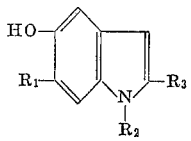

wherein $R_1$ is lower alkyl, $R_2$ is β-hydroxy lower alkyl, and $R_3$ is lower alkyl.

2. 1-(β-hydroxyethyl)2,6-dimethylindol-5-ol.

References Cited by the Examiner

UNITED STATES PATENTS 2,787,551  4/1957  Bell et al. _____ 260—319 XR

OTHER REFERENCES

Beer et al., Jour. Chem. Soc., 1951, pages 2029–2032.

ALEX MAZEL, *Primary Examiner.*

HENRY R. JILES, *Examiner.*

MARY U. O'BRIEN, *Assistant Examiner.*